3,173,864
WATER TREATMENT AND COMPOSITIONS USEFUL THEREIN

Arthur J. Freedman, Chicago Heights, Ill., assignor to Nalco Chemical Company, Chicago, Ill., a corporation of Delaware
No Drawing. Filed Feb. 8, 1961, Ser. No. 87,785
10 Claims. (Cl. 210—57)

This invention in general relates to processes for the treatment of water to make it less corrosive toward metals, especially toward metals constituting heat exchange surfaces, and to minimize the deposition on metal surfaces of alumina floc and other materials carried in suspension in the water. The invention further relates to compositions including a water-soluble lignosulfonate or a water-soluble naphthalene sulfonate and a water-soluble chromate salt (e.g., chromate or dichromate) especially adapted for the treatment of water and to treated water containing the aforesaid chemicals.

This invention is especially useful in the treatment of cooling water for heat exchangers to control the corrosion and fouling on metal heat transfer surfaces wherein the cooling water contains residual alumina floc and/or other suspended matter.

River water is usually relatively low in hardness and high in turbidity. This turbidity may consist of suspended clay and other forms of suspended silt, microbiological growths, iron and other suspended solids. Turbid water, whether it be river water or water from some other source, usually is clarified with alum and/or sodium aluminate before it is used as the recirculating cooling liquid in cooling systems. The commonly used clarification plant settling beds are somewhat inefficient and the settled solids, which include alumina floc, are easily disturbed by current and thermal gradients. Some of the precipitated alumina floc and other solids often are carried over into the make-up water for recirculating cooling systems. The total concentration of alumina floc and solids in this water may be only a few parts per million but, circulating in the system, they tend to agglomerate into larger particles and stick on surfaces of the cooling system, such as cooling tower decks, and especially on heat transfer surfaces. Also, the particles of alumina floc include and absorb other suspended matter, such as microbiological growths, corrosion products, silt, and the like. Over a period of time these suspended solids in the recirculating cooling water build up a voluminous, flocculent deposit which can severely reduce heat transfer coefficients and impede water flow through heat exchangers. Although the deposit is very light in density, it adheres tightly to hot metal surfaces and is not readily removed by simply increasing the water velocity through heat exchanger tubes during normal operations. It is accordingly a need in the field of water treatment to provide a combination of compatible chemicals in the cooling water which will keep suspended alumina floc in the cooling water and simultaneously minimize corrosion of the metal heat transfer surfaces and other component metal parts of the cooling system.

I have found that a combination of a water-soluble lignosulfonate or a water-soluble naphthalene sulfonate and a water-soluble chromate or dichromate salt is eminently suitable for this purpose. These two chemicals can be added to a cooling water containing suspended alumina floc separately, or they may be combined into a single, solid product in either granular form or in the form of a shaped article of manufacture, e.g., a water treating ball. The latter is placed in the cooling water system and the balls dissolve slowly as the cooling water is circulated thereover. These articles of manufacture are ordinarily the most convenient to use.

The water treating compositions of the invention comprise, as the essential component thereof, a water-soluble lignosulfonate or a water-soluble naphthalene sulfonate. A water-soluble chromate or dichromate salt may advantageously be present in the composition at a weight ratio of the two components in the range of about 1:4 to 7:1 respectively, where the two components are combined into a single water treating composition to be added to a cooling water system. Preferred compositions contain additional chemicals, examples of which are mercaptobenzothiazole or an alkali metal or ammonium salt thereof and also complexing or chelating agents which complex with aluminum ions in the water to be treated. The chromates and dichromates are primarly corrosion inhibitors for ferrous metals, i.e., iron or steels. These salts protect iron or steel heat exchange tubes and other ferrous metal components against substantial corrosion. Where the heat exchange tubes are made of other alloys such as admiralty metals which are high in copper, the compositions of the invention contain a chemical which protects the copper against corrosion. An effective and compatible chemical for this purpose is mercaptobenzothiazole or a water-soluble salt thereof, e.g., the sodium, potassium or ammonium salt.

Admiralty metals and brass are protected against corrosion by the latter chemicals. Admiralty metals are a class of alloys of copper, zinc and tin, ranging from about 65–90% copper, 4–34% zinc, and 1–10% tin. Exemplary admiralty metals are (a) 87% Cu, 5% Zn, and 8% Sn and (b) 70% Cu, 29% Zn, and 1% Sn.

Where employed, the mercaptobenzothiazole or water-soluble salt constitutes in my composition about 1.5–5% by weight of the total weight of itself, the lignosulfonate or naphthalene sulfonate, and the chromate or dichormate salt.

The mercaptobenzothiazole forms a protective film on brass or admiralty metal surfaces and aids in the protection of these heat transfer surfaces against corrosion.

As mentioned above, the compositions or treated water may include complexing or chelating agents which keep dissolved aluminum ions of dissolved aluminum compounds in solution by complexing with the aluminum ions. This function is distinguished from the function of the water-soluble lignosulfonate which provides a dispersing function for precipitated alumina floc and other materials suspended in the cooling water.

Examples of aluminum ion complexing or chelating compounds are citric acid, water-soluble salts of citric acid, e.g., sodium citrate, water-soluble fluoride salts such as sodium or potassium fluoride, gluconic acid, sugar acids and water-soluble derivatives of ethylene diamine tetracetic acid such as hydroxyethylated ethylene diamine tetracetic acid and sodium, potassium or ammonium salts of ethylene diamine tetracetic acid. Where employed, these compounds constitute about 2–20% by weight of the weight of the solids in the compositions of the invention.

Other chemicals which may be included in the water treating compositions or treated water are zinc sulfate which is an aid to the chromate and dichromate in corrosion protection of ferrous metals, the amount of zinc sulfate being about 5–20% by weight of the chromate and/or dichromate in the composition; a water-soluble, organic binding agent used to hold the solid particles together in a shaped article, e.g., a water treating ball, an example of which agent is dextrin and the amount of said agent being in the range of about 2–8% by weight of the composition; water-soluble filler material in said shaped articles, e.g., sodium chloride; and soda ash, 0–25% by weight of the composition.

The water-soluble lignosulfonates usually are derived as a by-product in the manufacture of sulfite pulp where wood is cooked with calcium disulfite-magnesium disulfite-sulfur dioxide liquor. In this process the lignin is converted to lignosulfonic acid. It is thereafter converted to a solid product such as calcium lignosulfonate, ammonium lignosulfonate, potassium lignosulfonate, or sodium lignosulfonate. Many of the marketed lignosulfonates contain appreciable quantities of reducing sugars. The presence of these reducing sugars appears to be disadvantageous in compositions of the invention because they tend to induce pitting of admiralty metal surfaces.

Therefore, I prefer to use water-soluble lignosulfonates from which the reducing sugars have been removed, as by mild oxidation with air, and especially those in which the reducing sugars have been oxidized to sugar acids ranging from about 10–40% by weight of the lignosulfonate. Sugar acids appear to be complexing agents in the treated water and aid in preventing deposits by chelating ions.

Both of the chromate and dichromate salts are oxidizing agents, the dichromate being the stronger oxidizing agent. There is a tendency for reaction between the chromate or dichromate salts and the lignosulfonate composition where water is present. This reaction consumes some of the chromate or dichromate. I have observed that his reaction occurs over a period of time in stored water treating balls, with the result that the water treating balls do not supply the calculated concentration of chromate or dichromate in the cooling water when they are placed in service. The reaction between the water-soluble lignosulfonate and a water-soluble chromate or dichromate salt can be reduced by utilizing one or more of the following features in the manufacture of shaped articles such as water treating balls. First, a water-soluble chromate salt such as sodium chromate is used in preference to a water-soluble dichromate salt, the former having a lesser oxidizing activity than the other. Secondly, the water-soluble chromate salt used in manufacturing the shaped articles can be of relatively large granular size, e.g., 1/64 to 1/2 inch in diameter, to minimize surface area of the chromate salt upon which the oxidation-reduction reaction occurs. Thirdly, though usually less satisfactory than the second instance, the density of the water-soluble lignosulfonate can be made greater to similarly reduce the reactive surface area at which the oxidation-reduction reaction occurs.

As heretofore stated, sugar acids have a chelating function with regard to metal ions, e.g., aluminum ions in the treated water, thereby preventing their deposition on the metal heat transfer surfaces. The sugar acids are those obtained by the mild oxidation of oxidizable sugars in the monosaccharide and disaccharide families. Crude lignosulfonates contain reducing sugars which can be oxidized with air to sugar acids. This constitutes one source of sugar acids. These acids can be obtained, however, by the oxidation of other oxidizable sugars and added as separate components to the compositions of the invention. Examples of the latter are sugar acids obtained by the mild oxidation of d-xylose, d-glucose, sucrose, and the like. The concentration of the reducing sugars in the compositions of the invention optimally are in the range of 10–40% by weight, based on the lignosulfonate or the naphthalene sulfonate.

The water-soluble naphthalene sulfonates which can be used in accordance with the invention may contain one or more sulfonated naphthalene nuclei. Examples of water-soluble naphthalene sulfonates which can be used in accordance with the invention are polymethylene-bis-naphthalene sulfonate, the sodium or potassium salts thereof, and alkyl naphthalene sulfonates or the sodium or potassium salts thereof in which the alkyl group contains about 1–12 carbons.

The preferred weight ratio in the compositions of the invention of the water-soluble lignosulfonate to the water-soluble chromate or dichromate salt is 2:3 to 6:1. The preferred ratio of the water-soluble naphthalene sulfonate to the water-soluble chromate or dichromate salt is about 2:3 to 6:1.

The corrosion inhibitors of the water treating compositions of the invention are water-soluble chromate or water-soluble dichromate salts, the most economical of which are sodium chromate and sodium dichromate. Potassium chromate, ammonium chromate, potassium dichromate, or ammonium dichromate may also be used, though they are ordinarily more expensive than the corresponding sodium salts. The chromate salts are active as corrosion inhibitors with regard to ferrous metals.

The following examples constitute some of the preferred embodiments of the compositions of the invention and the practice of the invention in the treatment of water.

*Example I*

| Components: | Percent by weight |
|---|---|
| Polymethylene-bis-naphthalene sodium sulfonate | 37.0 |
| Citric acid | 14.8 |
| Mercaptobenzothiazole | 3.6 |
| Sodium dichromate dihydrate | 11.7 |
| Soda ash | 32.9 |

The foregoing water treating composition was formulated as a pulverant mixture. This mixture was tested in a standard heat transfer test unit at a concentration in the cooling water of 20.3 p.p.m. of polymethylene-bis-naphthalene sodium sulfonate, 8.2 p.p.m. citric acid, 2.0 p.p.m. mercaptobenzothiazole, 5 p.p.m., expressed as $CrO_4^=$, of sodium dichromate, and 18.1 p.p.m. soda ash. The test was conducted over a 14 day period by circulating the water containing alumina floc through admiralty heat transfer tubes. At the end of this period the admiralty tubes were clean and bright.

Because of the powerful chelating properties of the citrate ion for copper in the admiralty tubes, mercaptobenzothiazole was utilized to prevent attack on the admiralty tubes.

*Example II*

| Components: | Percent by weight |
|---|---|
| Partially oxidized sodium lignosulfonate with most wood sugars removed by oxidation | 52.6 |
| Sodium citrate | 13.2 |
| Mercaptobenzothiazole | 2.6 |
| Sodium dichromate dihydrate | 11.9 |
| Soda ash | 19.7 |

A lightly wetted mixture of the foregoing components was pressed and shaped into water treating balls. These balls gave excellent results inhibiting corrosion and preventing the deposit of alumina floc in a cooling water in a standard heat transfer test unit where the concentration of the components in the water was 40.0 p.p.m. lignosulfonate, 10.0 p.p.m. sodium citrate, 2.0 p.p.m. mercaptobenzothiazole, 7.0 p.p.m., expressed as $CrO_4^=$, of sodium dichromate, and 15.0 p.p.m. of soda ash.

*Example III*

A water treating composition was made with a pulverant mixture of the following components.

| Components: | Percent by weight |
|---|---|
| Alkaline calcium lignosulfonate with reducing sugars oxidized to sugar acids | 54.7 |
| Mercaptobenzothiazole | 3.7 |
| Sodium dichromate dihydrate | 23.4 |
| Soda ash | 18.2 |

Example IV

Water treating balls were made from a composition containing the following components.

| Components: | Percent by weight |
|---|---|
| Alkaline calcium lignosulfonate with reducing sugars oxidized to sugar acids | 53.2 |
| Mercaptobenzothiazole | 3.6 |
| Sodium chromate | 24.8 |
| Sodium chloride | 7.1 |
| Dextrin | 3.5 |
| Water | 7.8 |

The calcium lignosulfonate of Examples III and IV was one made by treating whole sulfite liquor with lime and spray-drying the mixture. The reducing sugars in the sulfite liquor constituted about 25% of the solids, which sugars were oxidized to the acids with a residual reducing sugar content of less than 1%. The optimum concentrations of the components of the water treating compositions of the invention in cooling water are in the range of 15–60 p.p.m. of the water-soluble lignosulfonate or the water-soluble naphthalene sulfonate, 5–25 p.p.m., expressed as $CrO_4^=$, of the water-soluble chromate salt or dichromate salt, 1–5 p.p.m. of mercaptobenzothiazole, and about 1.5–24 p.p.m. of sugar acids. The water treating compositions of the invention are most effective at an optimum pH of the cooling water in the range of about 5 to 8.

It has been observed that where the cooling water contains dissolved chlorine, used as a biocide, there is a drop in the chlorine content of the water. This is probably due to a reaction with the lignosulfonate inasmuch as chlorine is known to react with lignin. The formation of chlorolignosulfonates, however, does not materially affect their activity as dispersants for alumina floc. The consumption of chlorine by the lignosulfonate, however, increases the chlorine demands to maintain an adequate biocidal chlorine content, and it is often desirable to use another biocide in the cooling water.

Compositions of the invention formulated into granular mixtures or shaped articles preferably contain at least about 40–70% by weight, based on the dry solids, of the water-soluble lignosulfonate or about 40–70% by weight, preferably about 55% by weight, on the same basis, of the water-soluble naphthalene sulfonate.

Where the compositions are formulated with mercaptobenzothiazole or a salt thereof, the ratio of the solids preferably is 40–70% by weight of either type of sulfonate, 10–60% by weight of the chromate or dichromate, and 1.5–5.0% by weight of the mercaptobenzothiazole or salt thereof, the aforesaid percentages being based on the weight of the aforesaid three solid components.

The invention is hereby claimed as follows:

1. A water treating product comprising an article made of adhered particles in which the solids content of said article is at least 40% by weight of water-soluble lignosulfonate particles, said lignosulfonate containing 10–40% by weight, based on said lignosulfonate, of sugar acids, and a member from the group consisting of sodium chromate particles and sodium dichromate particles present in a weight ratio in the range of 2:3 to 6:1.

2. The composition of claim 1 wherein said lignosulfonate is calcium lignosulfonate containing 10–40% by weight, based on said lignosulfonate, of sugar acids.

3. A corrosion inhibiting and alumina-dispersing composition consisting essentially of, on a dry basis, the following active ingredients:

| | Percent |
|---|---|
| A water-soluble lignosulfonate | 40–70 |
| A water-soluble chromate salt | 28–60 |
| A member from the group consisting of mercaptobenzothiazole and a water-soluble salt thereof | 1.5–5.0 | wherein the percentages are by weight based on the total weight of the three ingredients in the composition.

4. A corrosion inhibiting and alumina-dispersing composition comprising, on a dry basis, the following active ingredients:

| | Percent |
|---|---|
| Calcium lignosulfonate | 40–70 |
| Sodium chromate | 28–60 |
| Mercaptobenzothiazole | 1.5–5.0 | wherein the percentages are by weight based on the total weight of the three ingredients in the composition plus 10–40% by weight, based on the calcium lignosulfonate, of sugar acids.

5. A corrosion inhibiting and alumina-dispersing composition comprising, on a dry basis, the following active ingredients:

| | Percent |
|---|---|
| Calcium lignosulfonate | 40–70 |
| Sodium dichromate | 28–60 |
| Mercaptobenzothiazole | 1.5–5.0 | wherein the percentages are by weight based on the total weight of the three ingredients in the composition plus 10–40% by weight, based on the calcium lignosulfonate, of sugar acids.

6. A corrosion inhibiting and alumina-dispersing composition comprising, on a dry basis, the following active ingredients:

| | Percent |
|---|---|
| Calcium lignosulfonate | 40–70 |
| Sodium chromate | 28–60 |
| Sodium mercaptobenzothiazole | 1.5–5.0 | wherein the percentages are by weight based on the total weight of the three ingredients aforementioned in said composition plus 2–20% by weight, based on the total composition, of sodium citrate.

7. In a heat exchange process in which water having a pH of about 5 to 8 and containing alumina floc and metal ions is passed through a heat exchanger in contact with hot metal surfaces, the improvement which comprises inhibiting the deposition of deposits by said alumina floc and said ions on said metal surfaces by providing in said water a composition comprising, on a dry basis, the following active ingredients:

| | Percent |
|---|---|
| Calcium lignosulfonate | 40–70 |
| Sodium chromate | 28–60 |
| Sodium mercaptobenzothiazole | 1.5–5.0 | wherein the percentages are by weight based on the total weight of the three ingredients aforementioned is said composition plus 2–20% by weight, based on the total composition, of sodium citrate, the concentration of said composition in said water being an amount sufficient to provide 15–60 p.p.m. of said water-soluble lignosulfonate, 5–25 p.p.m., expressed as $CrO_4^=$, of said sodium chromate and 1–5 p.p.m. of said sodium mercaptobenzothiazole.

8. A process as claimed in claim 7 wherein said metal surfaces are metal surfaces of admiralty metal.

9. A corrosion inhibiting and alumina-dispersing composition consisting essentially of, on a dry basis, the following active ingredients:

| | Percent |
|---|---|
| A member selected from the group consisting of a water-soluble lignosulfonate and a water-soluble naphthalene sulfonate | 40–70 |
| A water-soluble chromate salt | 28–60 |
| A member from the group consisting of mercaptobenzothiazole and a water-soluble salt thereof | 1.5–5.0 | wherein the percentages are by weight based on the total weight of the three ingredients in the composition.

10. In a heat exchange process in which cooling water having a pH of about 5–8 and containing alumina floc and metal ions is passed through a heat exchanger in contact with hot metal surfaces, the improvement which comprises inhibiting the deposition of deposits by said alumina floc and said ions on said metal surfaces by adding to said water a solid composition comprising at least 40% by weight of water-soluble lignosulfonate particles, said lignosulfonate containing 10–40% by weight, based on said lignosulfonate, of sugar acids and a member from the group consisting of sodium chromate particles and sodium dichromate particles present in weight ratios in the range of 2:3 to 6:1, respectively, the addition of said solid composition providing a concentration in said cooling water having said pH of about 5–8 of 15–60 p.p.m. of said water-soluble lignosulfonate as a dispersant for said alumina floc, 1.5–24 p.p.m. of said sugar acids as a chelating agent for said metal ions, and 5–25 p.p.m., expressed as $CrO_4^=$, of said member from the group consisting of sodium chromate and sodium dichromate.

References Cited in the file of this patent

UNITED STATES PATENTS

| | | |
|---|---|---|
| 1,903,041 | Hall et al. | Mar. 28, 1933 |
| 2,194,491 | Bird | Mar. 26, 1940 |
| 2,208,101 | Michel | July 16, 1940 |
| 2,221,018 | Bachman et al. | Nov. 12, 1940 |
| 2,311,008 | Tucker | Feb. 16, 1943 |
| 2,327,323 | Teeters | Aug. 17, 1943 |
| 2,396,938 | Bersworth | Mar. 19, 1946 |
| 2,576,386 | Bird | Nov. 27, 1951 |
| 2,744,866 | Kahler | May 8, 1956 |
| 2,777,818 | Gambill | Jan. 15, 1957 |
| 2,826,552 | Bonewitz et al. | Mar. 11, 1958 |
| 2,872,281 | Kahler et al. | Feb. 3, 1959 |
| 2,934,503 | Chittum | Apr. 26, 1960 |
| 2,994,480 | Carter | Aug. 1, 1961 |
| 2,999,732 | Kahler et al. | Sept. 12, 1961 |

FOREIGN PATENTS

| | | |
|---|---|---|
| 826,770 | Great Britain | Jan. 20, 1960 |

OTHER REFERENCES

Betz: Handbook of Record, additional pages 8–12, 87, 90–96, 99, 148–171 and 174–176 relied on.

"Surface Active Agents and Detergents," Schwartz et al., vol. II, 1958, Interscience Publishers, Inc., New York, pp. 100–102 relied on.

Water Treatment for Recirculating Systems, Drane, Chemistry and Industry, Nov. 24, 1956, pp. 1367–1372.

Betz: Handbook of Industrial Water Conditioning, fifth edition, 1958, Betz Laboratories, Inc., Gillingham and Worth Sts., Philadelphia 24, Pa., pp. 97, 98, 172, 173, 177 and 178 relied on.